Patented Feb. 13, 1945

2,369,471

UNITED STATES PATENT OFFICE 2,369,471

COMPOSITIONS COMPRISING SOLID ETHYLENE POLYMERS

George H. Latham, Wilmington, Del., assignor to E. I. du Pont de Nemours & Company, Wilmington, Del., a corporation of Delaware No Drawing. Application April 28, 1939, Serial No. 270,659

7 Claims. (Cl. 260—4)

This invention relates to new compositions of matter, and more particularly to compositions comprising solid polymers of ethylene.

This invention has as an object the preparation of compositions comprising polymers of ethylene which possess valuable properties in addition to those possessed by the ethylene polymer itself. A further object is a method for modifying and improving the ethylene polymer by increasing its flexibility, transparency, softening point, and notch-bend resistance without sacrificing other valuable properties of the material, especially its excellent dielectric properties. A further object is the production of new and useful compositions of matter. Other objects will appear hereinafter.

These objects are accomplished by incorporating with the polymer of ethylene, more particularly described below, certain hydrocarbon and halogenated hydrocarbon polymers.

The polymers of ethylene used in the practice of this invention are the ethylene polymers obtained by the process described in United States Patents, 2,153,553 and 2,188,465. The process described in the first mentioned patent consists in subjecting ethylene to pressures in excess of 500 atmospheres under controlled elevated temperature conditions. This procedure results in various polymers of ethylene, the molecular weight of which varies depending upon the pressure and temperature conditions employed. By using pressures of more than 1000 atmospheres and temperatures of the order of about 200° C., solid polymers of ethylene can be formed. Under these conditions the polymerization reaction takes place smoothly, requiring several hours for completion. Or the more rapid reaction described in the second mentioned patent may be used. In this method a definite but small quantity of oxygen which may be as little as 0.01% but preferably 0.03% to 0.10% at 1500 atmospheres, is included in the ethylene treated. The pressures are at least 500 atmospheres and preferably at least 1000 atmospheres and below 3000 atmospheres. The temperatures are between 100° C. and 400° C. and more desirably from 150° C. to 250° C. Thus, as a specific instance of obtaining the ethylene polymer, ethylene containing 0.05% oxygen is compressed in a steel bomb to a total pressure of 1500 atmospheres and heated rapidly at 210° C. whereupon a very rapid change in pressure followed by a slow drop in pressure is observed. After five hours' heating at 210° C. the pressure is released and the product cooled. Under these conditions an 80% yield of the solid polymer, based on the ethylene used, is obtained. These solid ethylene polymers obtained as outlined above melt or soften above about 100° C., usually between about 110° C. and about 200° C. depending upon the molecular weight of the particular polymer, have a molecular weight in excess of 4000, and are essentially saturated products corresponding in composition substantially to $(CH_2)_x$. They are soluble in xylene at its boiling point and are unaffected by prolonged contact with air at ordinary temperatures. These solid polymers as ordinarily prepared show a crystalline structure when subjected to X-ray diffraction analysis.

The molecular weights mentioned herein were obtained by the method for determining the molecular weights of polymers of high molecular weight devised by H. Staudinger (see Berichte der deutschen chemischen Ges. 1934, 67B. 1247 et seq.), this method being based upon the measurement of the viscosity of a dilute solution of the polymer in tetrahydronaphthalene at 75° C. As this method may not be susceptible of a high degree of accuracy, the values given in this specification should be in all cases regarded as approximate.

The melting or softening points of the polymers were measured by a "ball and ring" method in which a film of polymer, supported over a ring, is heated by immersion in a heated non-solvent and a small steel ball is placed over the film. The melting or softening point is taken to be the temperature at which the polymer is sufficiently soft to permit the ball to pass through the ring. In this connection it is to be noted that the polymer does not melt sharply but changes slowly from a solid to a more or less viscous liquid.

It is to be understood that the polymers of ethylene mentioned herein mean those ethylene polymers identified above.

The hydrocarbon and halogenated hydrocarbon polymers which are incorporated with the ethylene polymers in the practice of the invention have molecular weights in excess of 1000 and may be of natural or synthetic origin. The preferred hydrocarbon and halogenated hydrocarbon modifying ingredients are linear in structure, have molecular weights in excess of 1000 and are substantially saturated in nature. These polymers are characterized by being elastic and stretchable, and by showing retraction after release of the stretching force. When these materials are properly blended with the ethylene polymer, the products obtained are substantially homogeneous materials characterized by being more flexible, more transparent, of higher softening point and of higher notch bend resistance than the unmodified ethylene polymer. The dielectric properties of these compositions are similar to those of the ethylene polymers, and the high breakdown resistance of these compositions is characteristic of the individual polymer components. Like the ethylene polymers, the present compositions can be shaped in the hot into various forms for commercial applications, for example, by extrusion, molding, casting, etc.

The preferred embodiment of this invention consists in blending the ethylene polymer with the modifying agent or agents mentioned above by means of heated mixing rolls of the type used in rubber technology. This blending operation may be suitably carried out in the temperature range of about 100° to about 150° C. by heating the rolls and, if desired, also heating the initial ingredients.

In another embodiment of the invention the ingredients are blended by mixing in hot solution in a suitable mutual solvent, and the product is recovered by evaporation of the solvent or by precipitating by the addition of a non-solvent for the mixture, which non-solvent is miscible with the original solvent. Thus, a blend of the ethylene polymer and polyisobutylene may be precipitated from hot solution in xylene by the addition of ethyl alcohol or acetone.

The invention is further illustrated by the following examples:

Example I

A solid polymer of ethylene of average molecular weight about 20,000 and an isobutylene polymer of average molecular weight about 100,000 of the type prepared by the polymerization of isobutylene in the presence of inorganic halides such as $BF_3$ and $AlCl_3$ are mixed in equal proportions by weight on a rolling mill of the type used for working rubber compositions. The rolls are heated to 120° C. during the process and mixing is continued until a uniform solid is obtained. The product thus obtained has a tensile strength of about 0.6 kg./mm.$^2$. (This value is increased somewhat by cold working.) The extension at break is about 500% and the permanent extension is about 250%.

In contrast, the unmodified ethylene polymer has the following physical properties: tensile strength about 0.7 kg./mm.$^2$, extension at break 300%, and permanent extension 300%. The unmodified polyisobutylene conforms to the following characteristics: very low tensile (about 0.1), extension at break 1,000%, and almost no permanent extension.

A composition containing 30% of ethylene polymer and 70% polyisobutylene was prepared as in Example I. The product is similar in appearance to that of Example I. The tensile strength of this material is about 0.45 kg./mm.$^2$ and its extension at break is 550%.

The above embodiment of this invention, in which the ethylene polymer is modified with polyisobutylene, yields products which are characteristic of the group of products produced when the modifying agent is one or more members of the class comprising linear substantially saturated hydrocarbon polymers.

Example II

Nine parts by weight of ethylene polymer of average molecular weight about 16,000 and three parts by weight of polyisobutylene of average molecular weight about 150,000 are dissolved in 88 parts by weight of toluene by heating at a temperature of 100° C. This solution is flowed out on a glass or metal surface and the solvent removed by heating in the temperature range of 100°–120° C. This produces a transparent, tough, rubbery film which has excellent adhesion to glass and metal surfaces and is useful as a protective and insulating coating.

Example III

Ethylene polymer of average molecular weight about 15,000 and polyisobutylene of average molecular weight about 200,000 are mixed on the rolls at 120° C. in the proportions of 80% of the former and 20% of the latter.

The product is removed from the rolls and placed in a rubber extrusion apparatus at 120° C. and extruded therefrom as a flexible tube. It may also be extruded over copper wire to give a flexible insulated wire.

Example IV

Ten parts by weight of ethylene polymer of average molecular weight about 27,000 and ten parts by weight of 30 minute milled pale crepe rubber are dissolved in 80 parts by weight of xylene by heating at 120° C. and agitating. When a homogeneous solution has been obtained, the solvent is removed by further heating at 120° C. to evaporate it. This procedure leaves behind a tough, rubbery product. This product may be further treated by working on a rubber rolling mill, from which it is sheeted out. This material possesses excellent heat sealing properties, making a strong bond when heated and pressed between surfaces of paper, wood, cloth, etc. Further, it is highly transparent and has strong adhesion to glass so that when a sheet of this material 0.025" thick is heated at 120° C. and pressed between two glass plates under a pressure of 50 pounds per square inch for three minutes, there results on cooling a laminated product suitable for use as a safety-glass of the type used for automobile windshields.

The ethylene polymer-rubber blend prepared as above may be further worked up employing various vulcanizing materials, accelerators, and assistants in the manner well known in the art for vulcanizing rubber and rubber-like materials.

In addition to polyisobutylene and rubber, other members of the class of hydrocarbon and halogenated hydrocarbon polymers of molecular weight in excess of 1,000 which may be blended with the ethylene polymer to modify its properties include butadiene and isoprene polymers; polymerized chloro-2-butadiene-1,3; halogenated ethylene polymers; chlorinated and hydrochlorinated rubber; hydrogenated rubber; balata; gutta percha; hydrogenated gutta percha; olefin and iso-olefin polymers other than polyisobutylene; etc.

The amounts of these materials to be blended with the ethylene polymer may be varied within wide limits depending on the nature of the polymer added and the properties desired in the finished product. Thus, the elastic properties of the ethylene polymer are perceptibly affected when relatively small amounts, such as 10%, of polyisobutylene are blended with it.

On the other hand, quite large amounts of such polymers as polyisobutylene may be incorporated, such as 70% or more, yielding a product which still largely resembles the ethylene polymer in appearance, cohesion and strength while showing certain specific improvements over the original polymer (the polyisobutylenes in question are soft and rubbery and have low tensile strength). It is to be noted that it is characteristic of the products of this invention that in proportion to the amounts blended they resemble the ethylene polymer in the majority of their properties more closely than the other polymer incorporated. Thus, even blends of half ethylene polymer and half of one of the other polymers yield a product whose properties are strongly dominated by the properties of the original ethylene polymer. Hence, the polymers other than the ethylene polymer which are employed in this invention for accomplishing specific modifications are definitely modifying agents for the ethylene polymer and not vice versa.

To obtain special effects it is frequently desirable to modify the ethylene polymer with more than one of the polymers mentioned above. Thus, a blend of 30 parts polyisobutylene of average molecular weight about 150,000 and 10 parts pale crepe rubber with 60 parts ethylene polymer of average molecular weight about 27,000 shows better adhesion to glass when applied as an interlayer for compound glass than does a corresponding composition of 40 parts polyisobutylene and 60 parts ethylene polymer.

The methods used for preparing the products of this invention include mechanical blending such as is used in Example I, blending by means of a common solvent as in Example II, or a combination of these methods as in Example IV. More rapid blending is generally obtained if the selected blending operation is carried out at a temperature higher than about 110° C.

Suitable common solvents for preparing blends as in Example II include not only toluene but other suitable solvents for the ethylene polymer, which comprise hydrocarbons and halogenated hydrocarbons of boiling point above about 70° C. Thus, benzene, xylene, trichlorethylene, tetrachlorethylene, etc., may be used. The blended products may be deposited from these solutions by evaporation of the solvent as in Example II or by the addition of precipitating solvent which is a non-solvent for the blend and miscible with the original solvent.

Due to the transparent nature of the products of this invention, it is often desirable to incorporate therein suitable dyes to alter their appearance or to incorporate certain pigments and fillers such as carbon black, chalk, floc cellulose, wood flour, etc., both to alter the appearance of the product and to improve its strength and durability. When appropriate amounts of these fillers are added to the products of this invention, especially about 30% to 50% by weight, molding powders are prepared from which rigid articles may be thermally molded by the processes both of compression and injection molding which are well known in the art. Furthermore, such loaded blends, especially those prepared containing less than 75% ethylene polymer by weight, may be rolled out hot onto burlap or other suitable backing to form valuable semi-rigid floor covering type materials similar to linoleum. These may be prepared in colored pigmented forms to obtain single color, mottled, or pattern designs of the conventional types.

The products of this invention, by virtue of their greater strength and higher notch-bend resistance as compared to the individual component polymers, find application in uses for which the component polymers are either ill-adaptable or cannot be used at all. The products of this invention are particularly well adapted to the production of tubes, rods, sheets, films, and the like by extrusion methods. The improved notch-bend resistance of the ethylene polymer-polyisobutylene blends together with their excellent dielectric properties or low dielectric loss, makes these uniquely useful in the electrical insulation field, especially in the insulation of high or ultra high frequency and/or high voltage cables. The previously mentioned homogeneity of these blends avoids ionization.

Another form in which the products of this invention may be handled is in dispersed form in water, a form analogous to rubber latex. Such dispersions are prepared using any suitable dispersing and/or protecting agents by reducing from the massive state such as by grinding in a ball or colloid mill, by mechanically working the dispersing agents into the product and slowly working in water, or by dispersing a hot organic solution of the product into water and removing the organic solvent by aeration. Such dispersions are useful forms in which to apply the products of this invention as coating materials for wood, cloth, paper, regenerated cellulose, and other bibulous materials, metal surfaces, wire screening, synthetic resinous materials, etc.

The products of this invention are useful for preparing sheets, foils, tapes, fibers, shaped articles, coatings, etc., which are characterized by their excellent electrical insulating properties, transparent nature, excellent adhesive and cohesive properties and the ability to be cold rolled or cold drawn into products of improved tensile strength. Sheetings of the products of this invention are of special value as transparent interlayers for compound glass because of their high resistance to breakage even in the cold and good adhesion to glass which prevents shattering of the laminated glass. Very thin sheetings of these materials, especially when prepared by blending high molecular weight ethylene polymer with other high molecular weight materials of the type hereinbefore described, are non-tacky and useful as transparent wrapping foils. In particular these compositions may be extruded from the well known type of worm extrusion machines used for rubber, with greater ease than any of the initial materials alone; and flexible tubing, rods, wire insulation, etc., may be made in this way.

These compositions may be sheeted or applied directly to flexible substrates, e. g. paper, fabrics, etc., on the usual type of machines used for calendering rubber. The sheets thus prepared may be applied to fabrics, paper, etc. by the application of heat and pressure. The coated fabrics thus obtained are useful in the production of raincoat and shower curtain materials, etc. The following is an example illustrative of this procedure:

| Ingredient | Parts by weight |
|---|---|
| Ethylene polymer (mol. wt. about 20,000) | 233 |
| Polyisobutylene (average mol. wt. about 100,000) | 100 |
| Titanium oxide | 20 |
| Zinc oxide | 20 |
| Whiting | 50 |
| Total | 423 |

The above ingredients were mixed on a rubber mill and the mix thus obtained calendered on a fabric. The product obtained had excellent feel and was very pliable.

Because of their insolubility in watery liquids the compositions of this invention are also useful for coating cloth to prepare "oil silk" type and floor covering materials as well as for waterproofing materials in general; as protective coatings for metal, paper, etc.; as heat sealing materials for paper, wood, and similar materials; as thermal and electrical insulating materials; and as molded and shaped articles for a variety of uses.

By means of the present invention it is possible to obtain products comprising the ethylene polymer in substantial amount and having higher softening point, improved flexibility, and possessing markedly improved properties which adapt the new compositions to uses to which the component materials are unsuited. A particularly valuable feature of this invention is the production of compositions comprising ethylene polymer which have a higher softening point, improved flexibility, and increased notch-bend resistance than could be obtained heretofore.

As many apparently widely different embodiments of this invention may be made without departing from the spirit and scope thereof, it is to be understood that I do not limit myself to the specific embodiments thereof except as defined in the appended claims.

I claim:

1. A method for raising the softening point, increasing the notch-bend resistance, and improving the flexibility of a polymer of ethylene, said method comprising blending with the polymer of ethylene a polymer which is elastic, stretchable, and retractable on release of the stretching force, which has a molecular weight in excess of 1000, and which is selected from the class of hydrocarbon and halogenated hydrocarbon polymers of the group consisting of butadiene and isoprene polymers, polyisobutylene halogenated ethylene polymers, polymerized chloro-2-butadiene-1,3, chlorinated and hydrochlorinated rubber, hydrogenated rubber, balata, gutta percha and hydrogenated gutta percha, said polymer of ethylene being that obtained by heating ethylene at elevated temperature to a pressure of at least 500 atmospheres and being solid at ordinary temperature and corresponding in composition substantially to $(CH_2)_x$, and showing by X-ray diffraction analysis a crystalline structure.

2. A composition of matter comprising a homogeneous mixture of a polymer of ethylene and a polymer which is elastic, stretchable, and retractable on release of the stretching force, which has a molecular weight in excess of 1000, and which is selected from the class of hydrocarbon and halogenated hydrocarbon polymers of the group consisting of butadiene and isoprene polymers, polyisobutylene halogenated ethylene polymers, polymerized chloro-2-butadiene-1,3, chlorinated and hydrochlorinated rubber, hydrogenated rubber, balata, gutta percha and hydrogenated gutta percha, said polymer of ethylene being that obtained by heating ethylene at elevated temperature to a pressure of at least 500 atmospheres and being solid at ordinary temperature and corresponding in composition substantially to $(CH_2)_x$, and showing by X-ray diffraction analysis a crystalline structure.

3. The composition defined in claim 2 in which said elastic polymer is polyisobutylene.

4. The composition defined in claim 2 in which said elastic polymer is rubber.

5. Water-proof sheet material comprising a flexible fabric sheeting having a coating of the composition defined in claim 2.

6. A wrapping sheet comprising in combination polyethylene within the range of 75 to 30 parts with polyisobutylene within the range of 25 to 70 parts, produced by thermoplastic shaping; and characterized by lack of brittleness, resistance to tearing, and breaking, high insolubility in watery liquids, toughness, strength and elasticity.

7. An insulating wrapper comprising a thermoplastically formed covering composed of polyethylene in the proportion of 75 to 30 parts with polyisobutylene in the proportion of 25 to 70 parts, the said covering being characterized by lack of brittleness, resistance to breaking and tearing, high insolubility in watery liquids, toughness, strength and elasticity, a high electrical breakdown resistance which is characteristic of the individual members of the composition; a low dielectric loss at ultra high radio frequencies, resistance to watery liquids and homogeneity sufficient to avoid ionization within the composition substance.

GEORGE H. LATHAM.